United States Patent

Mee

[15] 3,656,162

[45] Apr. 11, 1972

[54] DIPLEXER FOR RADIO COMMUNICATION

[72] Inventor: Thomas Francis Mee, New York, N.Y.

[73] Assignee: Litton Systems, Inc., Beverly Hills, Calif.

[22] Filed: Sept. 19, 1969

[21] Appl. No.: 859,507

[52] U.S. Cl. ................................................343/180, 325/23

[51] Int. Cl. ..........................................................H04b 1/52

[58] Field of Search ................343/175, 180; 325/21, 22, 23, 325/24, 123, 124; 333/6, 76

[56] References Cited

UNITED STATES PATENTS

| | | | |
|---|---|---|---|
| 2,258,974 | 10/1941 | Dagnall | 343/180 X |
| 2,747,082 | 5/1956 | Varela | 325/23 |
| 3,202,917 | 8/1965 | Kawahashi et al. | 325/24 X |
| 3,471,787 | 10/1969 | Morrison, Jr. | 325/23 X |
| 1,866,525 | 7/1932 | Carter | 325/124 |
| 3,435,347 | 3/1969 | Decker et al | 325/124 X |
| 3,538,466 | 11/1970 | Brand | 325/357 X |

*Primary Examiner*—Benedict V. Safourek
*Attorney*—Alan C. Rose and Alfred B. Levine

[57] ABSTRACT

A diplexer enabling radio transmitter and receiver to operate simultaneously or sequentially with the same antenna with closely spaced transmitter and receiver frequencies. The diplexer consists essentially of a low pass and notch filter in the transmitter circuit, a band pass filter in the receiving circuit and series coaxial cables of predetermined lengths in the transmitting and receiving circuits which are connected to a common antenna. The electrical length of the coaxial cable in the transmitting circuit is adjusted to be a high impedance to the receiver frequency, whereas the electrical length of the coaxial cable in the receiving circuit is adjusted to be a high impedance to the transmitter frequency. The low pass filter and the receiver band pass filter may be similar to those normally used in radio communication without diplexing. The notch filter is tuned to reject the wave energy generated by the transmitter at the receiver frequency.

1 Claims, 3 Drawing Figures

DIPLEXER FOR RADIO COMMUNICATION

BACKGROUND OF THE INVENTION

The invention relates to apparatus for transmitting radio signals to and simultaneously receiving radio signals from a common antenna.

In duplex operation of a radio transmitter and a receiver connected to a common antenna, it has been proposed to use narrow band filters or so-called "wave traps" in the transmitting and receiving circuits; but where the transmitting and receiving frequencies are closely spaced, the filters must be highly selective, resulting in complexity and undesirable losses in the signal currents. It has also been proposed to use a hybrid circuit with a balancing network, but this arrangement involves excessive losses and the use of special components at higher frequencies such as frequencies of the order of 100 MHz or more. These duplex circuits are thus subject to the disadvantages of increased cost and complexity, as well as limitations with respect to close spacing of the frequencies.

SUMMARY OF THE INVENTION

The object of the invention is to operate a radio transmitter and receiver connected to the same antenna where the separation of transmitting and receiving frequencies may be very close as, for example, a difference of one percent with negligible losses and simplified apparatus design.

In accordance with the invention, the antenna circuit is connected to the transmitting and receiving circuits through a conventional T-connection. The transmitting circuit includes a low pass filter, which would be necessary even if no diplexing were used, and a notch or band stop filter tuned to reject the component of the transmitter noise at the receiving frequency. A receiver preselector or band pass filter is connected in the circuit of the receiver as would be required if no diplexing were needed. In addition, a strip of coaxial cable of predetermined length $L_1$ is connected in series in the transmitting circuit which is equivalent to a shorted line whose electrical length is exactly equal or slightly less than a quarter wave length of the receiving signal frequency to present a high impedance to this signal. Similarly, a strip of coaxial cable of predetermined length $L_2$ is connected to the Tee junction in series in the receiver circuit, which is equivalent to a shorted line for the transmitter frequency. In this manner, a simple and efficient diplexer can be constructed which entails negligible power loss and permits simultaneous operation of a radio transmitter and receiver with the same antenna at closely spaced frequencies.

BRIEF DESCRIPTION OF DRAWING

Referring to the drawing.

DESCRIPTION OF A PREFERRED EMBODIMENT

Figure 1:
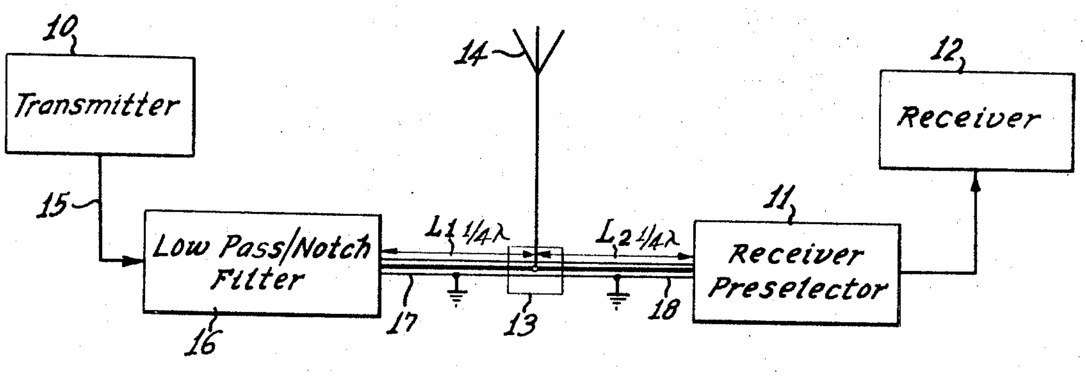
FIG. 1 is a schematic diagram of a diplexer embodying the invention.

FIG. 1 shows a diplexer wherein a radio transmitter 10 and a preselector or band pass filter 11 for radio receiver 12 are connected through a TEE junction 13 to a common antenna 14. As shown, the transmitter circuit 15 includes a low pass/notch filter 16 and a length $L_1$ of coaxial cable 17 connected in series relation with the T 13. The receiver filter 11 is connected in series relation with a length $L_2$ of coaxial cable 18 to the T 13. The transmitter 10 and the receiver 12 may be operated simultaneously at closely spaced frequencies.

In order to obtain the desired uncoupling between the transmitter and receiver, firstly the electrical length of the coaxial cable 17 is equal or slightly less than a quarter wave length of the receiver frequency, and the electrical length of the coaxial cable 18 a quarter wave length of the transmitter frequency; and secondly the filter 16 provides the necessary rejection of the transmitter noise or harmonics at or near the receiver frequencies. The result has been found to be less than 1 db loss of receiver sensitivity and less than 1 db loss of transmitted power for simultaneous transmission and reception when the separation of frequencies in one-half percent or more. This extraordinary result is particularly important in the VHF band and, as described, requires relatively simple modification of the conventional radio transmitting and receiving circuits where low pass and band pass filters are employed without diplexing. The predetermined lengths $L_1$ and $L_2$ of the cables 17 and 18 effectively isolate the transmitter 10 and receiver 12 to permit simultaneous operation at closely spaced frequencies.

Figure 2:
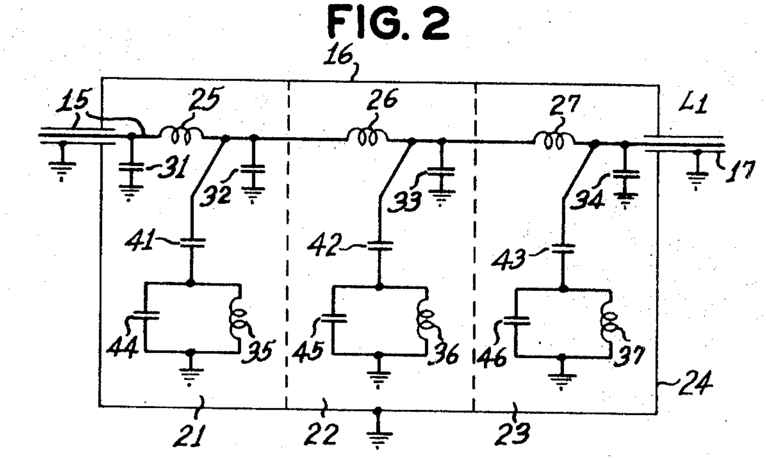
FIG. 2 illustrates a low pass/notch filter that may be used in the circuit shown in FIG. 1.
Figure 3:
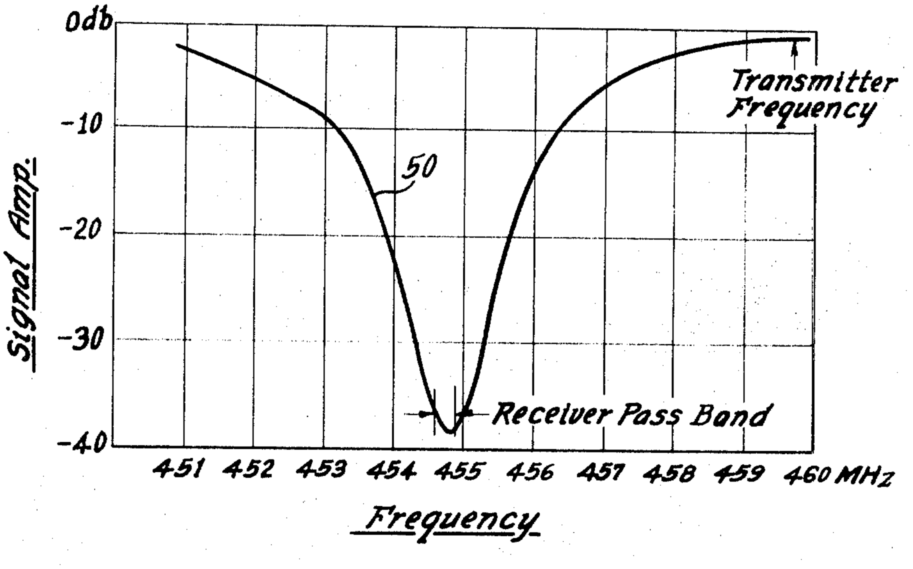
FIG. 3 is a graph of the characteristics of a typical notch or band stop filter.

The low pass and notch filters in the transmitting circuit 15 are preferably combined in one unit, a preferred design being shown by way of example in FIG. 2. As shown, the filter 16 comprises three similar sections 21, 22 and 23 in a grounded shield or enclosure 24. The series inductors 25, 26 and 27, and the shunt capacitors 31, 32, 33 and 34 provide the desired low pass band frequency characteristic. The inductors 35, 36 and 37, and the capacitors 41–46, constitute the notch or band stop filter the characteristics of which for an assumed frequency band are shown in FIG. 3. For the selected transmitter and receiver frequencies the capacitors 31–34 may be variable capacitors, 2–9 pF; capacitors 41–43 may be variable capacitors, 0.25–1.5 pF; and 44–46 capacitors may be variable capacitors, 0.35–3.5 pF. These values and the inductances of inductors 25–27 and 35–37 are determined by the signalling frequencies chosen.

The characteristics of the described notch filter for an assumed transmitter frequency of 459.8 MHz and a receiver frequency of 454.7 MHz are shown by the curve 50 of FIG. 3. As indicated, the transmitter noise is reduced nearly 40 db for the frequency components in the receiver pass band and no degradation of the receiver occurs when the transmitter is operating.

What is claimed is:

1. An improved diplexer circuit for connecting a radio transmitter and a radio receiver to a common antenna, wherein the transmitter operates at a first transmitter frequency and the receiver operates at a second receiver frequency within one percent of said first frequency, comprising:

a low pass filter connected in series with said transmitter;

a notch filter connected in series with said low pass filter tuned to reject noise generated by said transmitter at said second receiver frequency;

said low pass filter and said notch filter integrally combined into first, second and third sections serially connected and housed within a common grounded enclosure;

said low pass filter in said first, second and third sections each including a two terminal inductor serially connected to the other inductors in said other sections and a capacitor shunting the terminal of said inductor furthest from said transmitter to said grounded enclosure;

said low pass filter in said first section including an additional capacitor shunting the terminal of the inductor nearest said transmitter to said grounded enclosure;

said notch filter in said first, second and third sections each including a shunt capacitor having one electrode connected between the terminal of said first mentioned inductors furthest from said transmitter and said first mentioned capacitors, and further including second shunt capacitors and inductors connected in parallel between the second electrode of each of said first mentioned notch filter shunt capacitors and said grounded enclosure;

a first coaxial cable connected in series between said notch filter and said common antenna, the length of said coaxial cable being a quarter wave length of said second receiver frequency such as to present a high impedance to said second receiver frequency;

a band pass filter connected in series with said receiver; and a second coaxial cable connected in series between said band pass filter and said common antenna, the length of said second coaxial cable being a quarter wave length of said first transmitter frequency such as to present a high impedance to said first transmitter frequency; whereby said transmitter and receiver may be operated simultaneously in combination with said common antenna without interference and with negligible losses.

* * * * *